June 19, 1951 R. M. KENNEDY ET AL 2,557,118
ALKYLATION OF ISOBUTANE WITH PROPYLENE
Filed Nov. 9, 1949
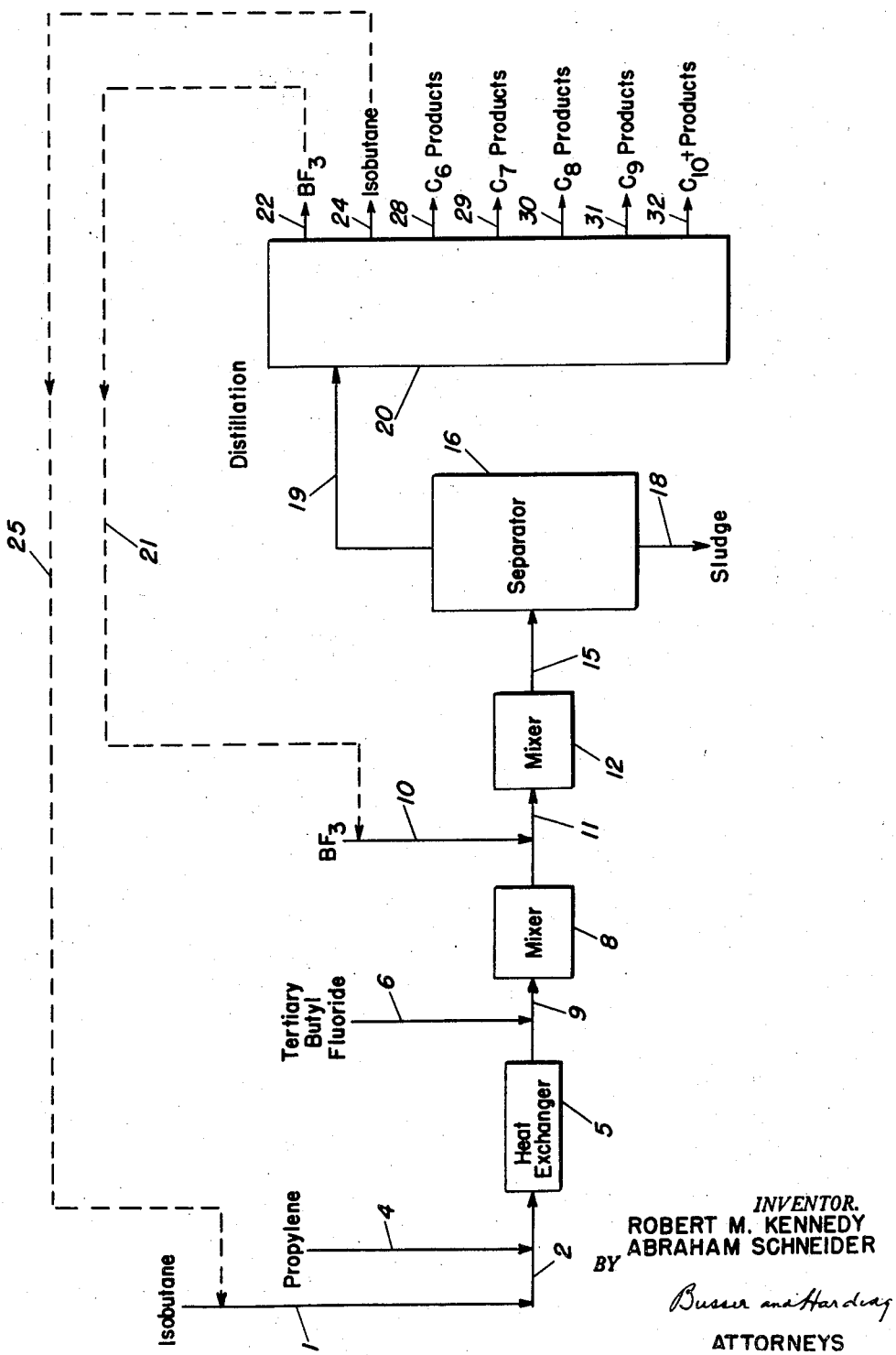
INVENTOR.
ROBERT M. KENNEDY
ABRAHAM SCHNEIDER
BY
*Busser and Harding*
ATTORNEYS

Patented June 19, 1951

UNITED STATES PATENT OFFICE 2,557,118

ALKYLATION OF ISOBUTANE WITH PROPYLENE

Robert M. Kennedy, Newtown Square, and Abraham Schneider, Philadelphia, Pa., assignors to Sun Oil Company, Philadelphia, Pa., a corporation of New Jersey Application November 9, 1949, Serial No. 126,276

10 Claims. (Cl. 260—683.4)

This invention relates to the preparation of hydrocarbons especially suitable for use as fuels for spark type internal combustion engines, or as components of such fuels, by the reaction between isobutane and propylene under novel catalytic conditions.

Neither isobutane nor propylene as such have practical value in the preparation of fuel compositions for use in high compression spark type internal combustion engines, such as aviation or automotive engines, because of their high volatility, and further because of the fire hazard involved when substantial quantities thereof are present in a fuel composition. The present process provides a novel and economically feasible process for converting isobutane and propylene to other hydrocarbons which are valuable as components of fuels because of their high anti-knock characteristics and relatively high flash point.

The alkylation of hydrocarbons, such as isobutane, by olefins under the catalytic influence of sulfuric acid or anhydrous hydrofluoric acid, usually at temperatures of from $-10°$ C. to $30°$ C., has been described. However, these and other catalysts which have been proposed heretofore for carrying out such an alkylation are insoluble in the hydrocarbons, or at most are soluble only to a limited extent. In such processes, therefore, it has been necessary to effect intimate contact between the hydrocarbon phase and the catalyst phase, which usually requires provision of a mechanically agitated reactor for continuously and vigorously agitating the reaction mixture during the reaction period. This adds considerably to the expense of the operation with respect to both installation and operating costs.

It has now been found that by employing novel catalytic conditions, as hereinafter fully described, hydrocarbons having the properties desired for fuel components can be prepared in good yield by the alkylation of isobutane with propylene, the reaction being effected in homogeneous phase.

The process of the present invention comprises bringing together an alkyl fluoride and $BF_3$ in the presence of isobutane and propylene at a suitable temperature, as hereinafter fully set forth, whereby a catalytic condition becomes established which causes the immediate alkylation of the isobutane by the propylene, and other reactions of value in producing the desired hydrocarbons. In bringing together the alkyl fluoride and $BF_3$, the $BF_3$ can be introduced into a solution of the alkyl fluoride in a mixture of the reactants, or both of the catalytic components can be introduced simultaneously but separately into the mixture of reactants. It is also permissible first to dissolve each of the catalytic components in separate portions of isobutane, and then bring together the separate portions in the presence of propylene to effect reaction. It is not permissible, however, to premix the alkyl fluoride and $BF_3$ in the absence of either the isobutane or propylene, for in such case the catalytic conditions will be immediately spent when the alkyl fluoride and $BF_3$ are brought into contact with each other. The components of the catalyst and the hydrocarbon reactants form a homogeneous phase, irrespective of their mode of addition, so that reaction does not depend upon contact between separate phases, and hence the mechanical agitation required to provide contact between separate phases is unnecessary.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with $BF_3$ to promote the alkylation of isobutane with propylene.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes, and the like. As specific illustrations of secondary fluorides, the following may be mentioned: isopropyl fluoride; 2-fluoro-butane; 2-fluoro-3-methylbutane; and 2-fluoro-3,3-dimethylbutane . A few specific examples of tertiary fluorides are: t-butyl fluoride; t-amyl fluoride; 2-fluoro-2,3-dimethylbutane and other t-hexyl fluorides; t-hepyl fluorides; and 4-fluoro-2,2,4-trimethylpentane and other t-octyl fluorides. It will be understood that the specific compounds named above are given merely by way of illustration and that any alkyl fluoride (with the exception of methyl fluoride) will produce an operative catalytic combination with $BF_3$ provided the temperature is above the minimum values as set forth above.

The temperature at which such reaction will be obtained varies, however, with the particular alkyl fluoride employed. We have found that when the fluoride is a tertiary fluoride, the reaction begins to occur to a substantial extent at temperatures as low as −120° C. When the alkyl fluoride is a secondary fluoride, the reaction takes place to a substantial extent at temperatures as low as −90° C. At temperatures below this value, a secondary fluoride in combination with $BF_3$ has little catalytic effect. When the alkyl fluoride is a primary fluoride, the reaction temperature should be above −10° C. in order to obtain substantial catalytic action. Ethyl fluoride, however, has been found to be more inert than the primary fluorides having three or more carbon atoms per molecule and requires a temperature of at least about +20° C. in order to give rise to substantial catalytic action. Methyl fluoride in combination with $BF_3$ does not give any substantial catalytic effect at least at temperatures below +150° C., and is not considered within the scope of the present invention.

The reaction may, if desired, be carried out at much higher temperatures than the minimum values above specified, and no definite maximum temperature can be given for all cases. In practice the maximum temperature which may be employed usually will depend upon the pressure under which the available equipment is adapted to operate or upon the undesired promotion of cleavage and disproportionation observed at relatively high temperature. As a general rule, it will be desirable to operate at all times at temperatures below +150° C. and usually well below this value, preferably below 25° C. A relatively low reaction temperature tends to suppress disproportionation and cleavage of the hydrocarbon products. It is noteworthy, however, that the use of the present type of catalytic agents permits the present alkylation to be conducted over a much wider range of temperatures than are employed in the known alkylation processes using other catalysts.

In the present reaction, in addition to the alkylation of isobutane with propylene, self-alkylation of isobutane and polymerization of propylene, are observed. If desired, the polymerization of propylene may be suppressed by using a large ratio of isobutane to propylene. These side reactions produce hydrocarbons of value. The products of the present process are gasoline hydrocarbons, i. e., hydrocarbons boiling in the gasoline range, and comprise branched chain hydrocarbons having from 6 to 9 carbon atoms per molecule, together with a minor proportion of products having a higher molecular weight. These hydrocarbons exhibit high anti-knock properties which render them especially valuable as components of fuel compositions. Since practically all of the formed hydrocarbons are suitable for such use, it is generally unnecessary to separate the mixture into narrow fractions. Thus, a fraction containing hydrocarbons having from 6 to 8 or 9 carbon atoms per molecule may be separated from the reaction mixture and employed without further separation. Thus, the process of the present invention provides a rapid and economically feasible process for the conversion of isobutane and propylene into valuable fuel components. The products having more than 9 carbon atoms per molecule are highly branched and exhibit high anti-knock properties, and are especially valuable for use in safety fuel compositions.

In the present process, it is characteristic that there will be formed, in addition to the alkylation product of isobutane and propylene, that hydrocarbon which is equivalent to the alkyl fluoride employed. For example, if isopropyl fluoride or normal propyl fluoride is used, propane will be obtained in the product; if tertiary butyl fluoride is used, isobutane will be present in the product. Where the alkyl fluoride employed contains a tertiary carbon atom, the hydrocarbon formed therefrom is capable of entering into the reaction, and consequently may be partly converted into one or more other isoparaffins. Where the alkyl fluoride does not contain a tertiary carbon atom, such further reaction of the hydrocarbon formed from the alkyl fluoride does not occur. Tertiary butyl fluoride, which is converted to isobutane in the reaction, is a preferred catalytic component, since the so-formed isobutane will enter into the reaction and enhance the yield of the reaction.

It is preferrred to employ an excess of isobutane in the reaction; the preferred molar ratio of isobutane to propylene being from 2:1 to 10:1. The preferred molar ratio of alkyl fluoride to hydrocarbon reactants is from 1:2 to 1:30. The amount of $BF_3$ reacted to initiate the reaction is small and is not considered critical. From about 1 to 10 grams per 100 grams of the hydrocarbon reactants is suitable and gives good results, but more or less may be employed.

Referring to the flow-sheet, isobutane enters the system through line 1 and is passed through line 2 wherein it is mixed with propylene which is introduced through line 4. The hydrocarbon mixture flows through heat exchanger 5, which may be either a cooler or a heater, depending upon the temperature at which it is desired to conduct the reaction. On leaving heat exchanger 5 the hydrocarbon mixture is mixed with an alkyl fluoride, tertiary butyl fluoride being used as illustrative, which is introduced through line 6. However, both catalytic components may be introduced simultaneously but separately into the hydrocarbon mixture. Other modes of addition are discussed hereinbefore. The hydrocarbon mixture containing tertiary butyl fluoride is then passed into mixer 8 via line 9. It is apparent that if there is sufficient turbulence in line 9, mixer 8 may be omitted. The amount of alkyl fluoride may be varied, but may advantageously be within the range of 1 mole of alkyl fluoride to from 10 to 30 moles of the hydrocarbon reactants.

After the addition of the alkyl fluoride, $BF_3$ is introduced through line 10 into the mixture of tertiary butyl fluoride, isobutane, and propylene flowing through line 11. The amount of $BF_3$ to add is not critical, a very small amount being sufficient to establish the necessary catalytic condition.

A catalytic condition becomes established immediately upon mixing the tertiary butyl fluoride and $BF_3$, and alkylation starts immediately. The mixture passes through mixer 12 (which may be omitted if turbulence in the flow line is sufficient), and the alkylation proceeds rapidly under the catalytic influence of the $BF_3$-alkyl fluoride combination.

Upon completion of the reaction, the mixture becomes heterogeneous due to separation of a sludge from the hydrocarbon phase. The reaction mixture continuously passes from mixer 12 through line 15 and is introduced into separator 16 wherein the two phases are allowed to separate. The sludge settles to the bottom of the separator and is withdrawn through line 18. This material contains fluorine derived from the alkyl fluoride together with BF₃ in some sort of complex form. If desired, means (not shown) may be provided for recovering BF₃ from the sludge and re-using the same. Hydrogen fluoride may also be recovered from the sludge.

The hydrocarbon product is withdrawn from separator 16 through line 19 and is sent to distillation zone 20 for separation of the components. Distillation zone 20 will usually comprise a plurality of separate distillation steps suitable for making the separations indicated. The lowest boiling component will be any BF₃ which has remained dissolved in the hydrocarbon layer. As indicated, this BF₃ may be withdrawn through line 22 and recycled through line 21. Also, any unreacted isobutane is removed through line 24 and recycled through the process through line 25.

The products of the reaction, consisting of branched-chain hydrocarbons having 6 or more carbon atoms, are removed through lines 28, 29, 30, 31 and 32 respectively. If it is desired to employ a mixture thereof, it is obvious that the separation need not be as shown; for example, hydrocarbons containing 6, 7 and 8 carbon atoms may be recovered as a single product.

The following example illustrates a specific embodiment of the present invention:

Example

A solution of 7 g. of BF₃ in 117 g. isobutane was charged to a pressure reactor and a mixture comprising 70 g. isobutane, 25 g. propylene and 41 g. isopropyl fluoride was slowly added thereto over a period of 80 minutes, the temperature being maintained at 0° C. There was obtained 27 g. of lower layer, 140 g. of saturated low boiling material and 77 g. of saturated hydrocarbon product. Analysis of the hydrocarbon product gave the following results:

|  | Vol. % of product |
|---|---|
| C₆: 2,3-dimethylbutane | 5.4 |
| Total | 5.4 |
| C₇: 2,2-dimethylpentane | 1.8 |
| 2,4-dimethylpentane | 5.8 |
| 2,3-dimethylpentane | 5.3 |
| 2-methylhexane | 0.5 |
| Total | 13.4 |
| C₈: 2,2,4-trimethylpentane | 17.0 |
| 2,4-dimethylhexane | 3.0 |
| 2,5-dimethylhexane | 5.2 |
| 2,2,3-trimethylpentane | 2.7 |
| 2,3,4-trimethylpentane | 1.1 |
| 2,3,3-trimethylpentane | 2.2 |
| 2,3-dimethylhexane | 0.7 |
| Total | 31.9 |
| C₉ and heavier | 49.3 |

It will be noted that the products are practically exclusively branched chain hydrocarbons of high anti-knock properties valuable for use as/or in fuel compositions.

This application is a continuation-in-part of our co-pending application Serial No. 38,167, filed July 10, 1948.

We claim:

1. Method of preparing gasoline hydrocarbons by the instantaneous alkylation in homogeneous phase of isobutane with propylene which comprises reacting isobutane with propylene in the presence of a catalyst comprising an admixture of BF₃ and an alkyl fluoride having at least two carbon atoms per molecule at a temperature sufficient to effect said instantaneous homogeneous phase reaction, said temperature being in the range of from −120° C. to 150° C.

2. Method according to claim 1 wherein a mixture of hydrocarbons containing from 6 to 8 carbon atoms per molecule is separated from the reaction mixture.

3. Method according to claim 1 wherein the molecular ratio of isobutane to propylene is from 2:1 to 10:1.

4. Method of preparing gasoline hydrocarbons by the instantaneous alkylation in homogeneous phase of isobutane with propylene which comprises reacting isobutane with propylene in the presence of a catalyst comprising an admixture of BF₃ and a tertiary alkyl fluoride at a temperature sufficient to effect said instantaneous homogeneous phase reaction, said temperature being in the range of from −120° C. to 150° C.

5. Method according to claim 4 wherein the alkyl fluoride is tertiary butyl fluoride.

6. Method of preparing gasoline hydrocarbons by the instantaneous alkylation in homogeneous phase of isobutane with propylene which comprises reacting isobutane with propylene in the presence of a catalyst comprising an admixture of BF₃ and a secondary alkyl fluoride at a temperature sufficient to effect said instantaneous homogeneous phase reaction, said temperature being in the range of from −90° C. to 150° C.

7. Method according to claim 6 wherein the alkyl fluoride is isopropyl fluoride.

8. Method of preparing gasoline hydrocarbons by the instantaneous alkylation in homogeneous phase of isobutane with propylene which comprises reacting isobutane with propylene in the presence of a catalyst comprising an admixture of BF₃ and a primary alkyl fluoride having at least three carbon atoms per molecule at a temperature sufficient to effect said instantaneous homogeneous phase reaction, said temperature being in the range of from −10° C. to 150° C.

9. Method according to claim 7 wherein the alkyl fluoride is normal butyl fluoride.

10. Method of preparing gasoline hydrocarbons by the instantaneous alkylation in homogeneous phase of isobutane with propylene which comprises reacting isobutane with propylene in the presence of a catalyst comprising an admixture of BF₃ and ethyl fluoride at a temperature sufficient to effect said instantaneous homogeneous phase action, said temperature being in the range of from 20° C. to 150° C.

ROBERT M. KENNEDY.
ABRAHAM SCHNEIDER.

REFERENCES CITED

The following references are of record in the file of this patent:

UNITED STATES PATENTS

| Number | Name | Date |
|---|---|---|
| 2,304,290 | Van Peski | Dec. 8, 1942 |
| 2,413,384 | Schmerling | Dec. 31, 1946 |